United States Patent [19]

Cleary et al.

[11] 4,132,355

[45] Jan. 2, 1979

[54] ELECTRONIC TEMPERATURE CONTROL SYSTEM

[75] Inventors: Robert J. Cleary, Levittown; Ronald R. Chin, Flushing, both of N.Y.

[73] Assignee: Energy Master, Inc., New York, N.Y.

[21] Appl. No.: 798,142

[22] Filed: May 18, 1977

[51] Int. Cl.² ............................................. F23N 5/20
[52] U.S. Cl. ........................................ 236/47; 236/51; 340/147 R
[58] Field of Search .................... 236/46 R, 47, 51; 165/12; 62/158; 340/147 R

[56] References Cited

U.S. PATENT DOCUMENTS

| | | | |
|---|---|---|---|
| 3,306,348 | 2/1967 | Tucker | 165/12 |
| 3,972,471 | 8/1976 | Ziegler | 236/46 R |
| 3,979,060 | 9/1976 | Tierce | 236/46 R |
| 4,021,615 | 5/1977 | James et al. | 340/147 R |

Primary Examiner—William E. Wayner

Attorney, Agent, or Firm—Burns, Doane, Swecker & Mathis

[57] ABSTRACT

The disclosure relates to a system for conserving energy used by temperature regulating units, such as space heaters and air conditioning units, by overriding local thermostatic controls therefor to prevent operation of the units except when a preselected temperature is reached at a master thermostat, the preselected temperature being selected to reduce energy consumption. A seven-day timer and gating circuit enable the overriding of the thermostatic controls during preselected periods of the day, for example during periods when the building is not in use. The system includes a transmitter for transmitting control pulses generated responsively to the timer and master thermostat over the electrical power distribution network of the building. Receivers connected to the local thermostatic controls detect pulses at particular frequencies, and shut-off the electrical power provided to the thermostatic controls responsive to the detected pulses, to thereby prevent operation of the associated temperature regulating units.

5 Claims, 9 Drawing Figures 4,132,355

ELECTRONIC TEMPERATURE CONTROL SYSTEM

BACKGROUND OF THE INVENTION

In certain factory and office building, circuits for operating heating and air conditioning apparatus for various parts of the building are controlled by conventional individual thermostats which have a limited range of adjustment. Thus, the lowest adjustment for the control for heating apparatus may be 50° F. in work or office space. Also, while apartments, motels and like buildings generally are arranged permiting localized adjustments of the controlled temperatures in the individual units, the occupants of the units may be unwilling to adjust the controls to lower the heating temperatures and raise the cooling temperatures such as is now considered necessary for energy conservation, particularly during all or some of the night hours. In some of these locations, such as work space in a factory building, it may be desirable and perfectly safe when the space is not being used to maintain certain heating apparatus off for so long as the inside temperature exceeds 40° F. In apartments and like buildings, overriding the occupants' adjustments of controls for heating and air conditioning apparatus from remote locations may be necessary to insure that an appropriate temperature limit is imposed.

While the problem has been generally recognized, previous solutions generally have involved the high cost of providing separate additional control wiring and other equipment and of installing that equipment. Thus, some prior systems have employed low voltage cables, thereby eliminating the need to install protective conduits or large gauge wiring. Other prior systems used multiplexing to combine all their signals onto a few coaxial cables. But the need to use additional wiring and for sophisticated multiplexing equipment was not eliminated thereby.

A known control system, such as illustrated in U.S. Pat. No. 4,021,615 to James et al overcomes the need for providing additional building wiring by transmitting control pulse bursts over exitsing telephone lines. The system has disadvantages inter alia that (1) the transmitting control circuitry must be tapped into each phone line at the branch exchange; (2) the system receivers must be tapped into the phone lines at each remote location; and remote receivers can only be located in areas of the building served by phone lines, typically less than all of the building.

Accordingly, it is an object of the present invention to provide a wireless control system for electrical apparatus, which system utilizes the same wiring used to connect the apparatus to the electric supply.

It is another object of the present invention to provide a temperature control system wherein control signals are conveyed to temperature controlling apparatus over electric power line wiring for the enclosure having its temperature controlled.

It is still another object of the invention to provide a temperature control system including a master transmitter for applying control signals determined by temperature and time at a master location to power lines for transmission thereby to receiver's at the location of controlled apparatus along the power lines.

These and other objects and advantages of the present invention will be apparent from the claims and from the following detailed description when read in conjunction with the appended drawings.

THE DRAWINGS

THE DETAILED DESCRIPTION

Figure 1:
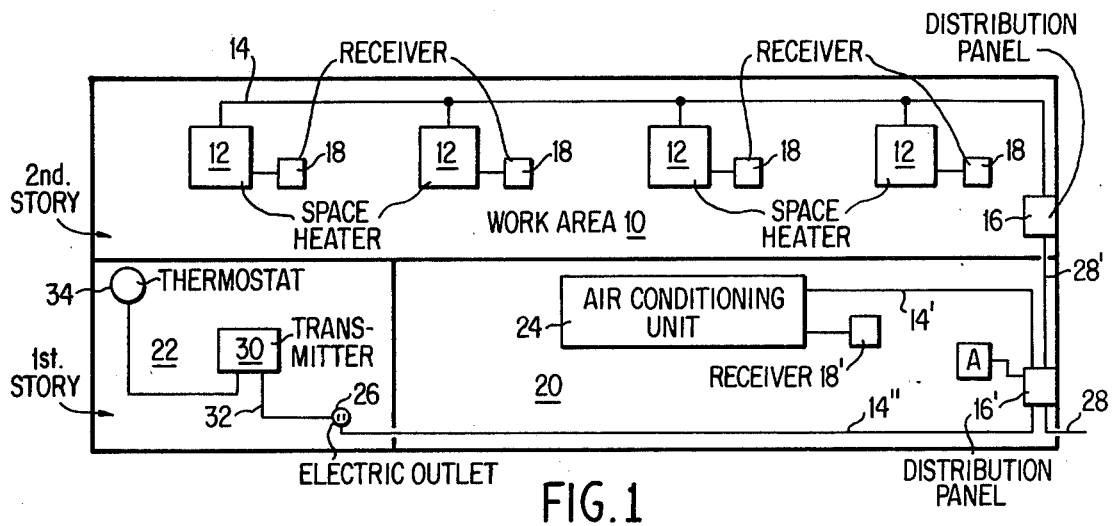
FIG. 1 is a diagrammatic view of a control system in accordance with the present invention for controlling temperatures in two-story building shown in vertical cross section.

FIG. 1 is a schematic diagram showing the wireless control system of the present invention adapted for off hours or night time control of temperature regulating units for a structure such as space heaters and air conditioning units. Although an embodiment of the present invention is described in connection with the particular structure shown in FIG. 1 having heating and cooling equipment in particular locations, it will be understood that the present invention may be adapted to control heating and/or cooling equipment in structures of vertually any size, configuration and use.

General work area 10 on the second story of the building is shown provided with four space heaters 12. These heaters may be powered by electricity or some other fuel such as gas. In either case, each of the space heaters 12 is preferably provided with an automatic thermostatic temperature control circuit of a usual type connected through electric power line 14 from a power distribution panel 16 for normally maintaining the temperature of the area at an appropriate working temperature. Also, each heater is provided with a control receiver 18 which reacts to control signals received over the line 14 in a manner to be described later.

The first story of the building includes an office area 20 and a control room 22. An air conditioner unit 24 in the office space is energized through electric power line 14' from a power distribution panel 16'. Air conditioner unit 24 is connected to a control reciever 18' which may be controlled by a control signal imposed on power line 14' in a manner hereinafter described. Such an air conditioner unit will normally be provided with a builtin automatic thermostatic temperature control of a usual type.

A power outlet 26 in the control room 22 is connected by power line 14" to the distribution panel 16'. The outlet 26 may be a usual standard 110 volt outlet original provided for the general use i.e., for receiving the connector plug from a 110–117 volt, 60 Hz electrical appliance. It will be noted that the power lines 14, 14' and 14" are energized from the same power line source through service conductors 28 which supply distribution panel 16' and, through it and conductors 28', distribution panel 16. The building will ordinarily be such that a three phase power supply is provided, although concepts of the invention are applicable to single phase suppliers as well. A control transmitter 30 may be located in a control room 22 and be provided with conductors 32 connecting it to outlet 26. The transmitter 30 is also connected to a master thermostat 34. The thermostat may be located at a window of the building for exposure to a temperature approximating that of the coldest portion of the building. The control transmitter and master thermostat will be described in detail in connection with FIG. 3.

Figure 2A:
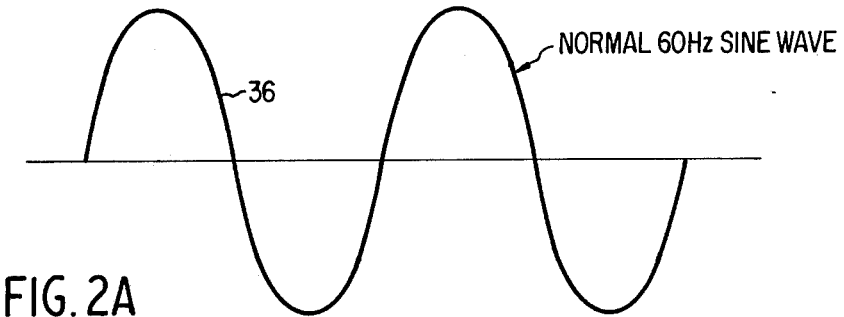
FIGS. 2a and 2b are, respectively, views of a pure sine wave power voltage signal and of the same signal with control pulses of a preselected frequency imposed thereon in accordance with the present invention.
Figure 2B:
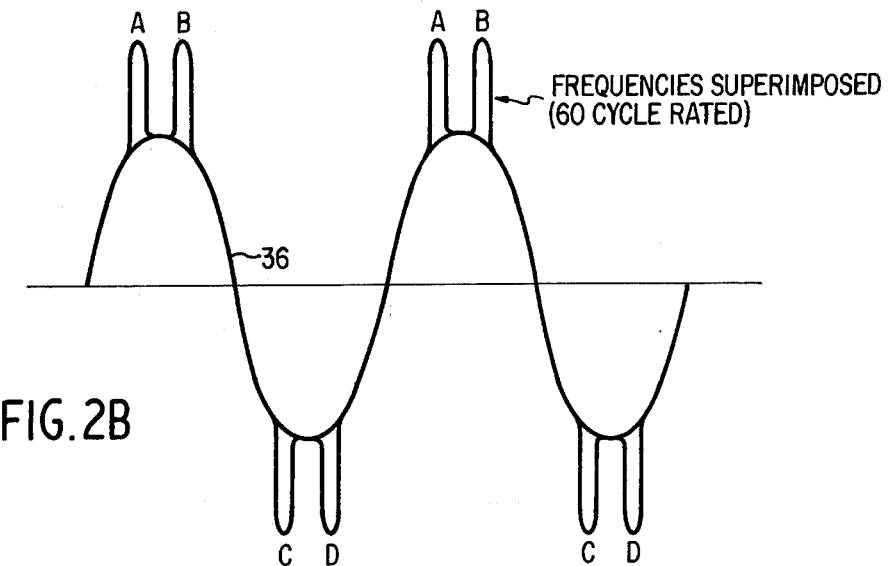

The control transmitter may be operative to impose control pulses on the electrical distribution network of the building. FIG. 2a represents a theoretically pure sine signal 36 which is normally carried by the power lines 14, 14' and 14" and may be 60 Hz, at 110–117 volts. The same sine wave 36 with control pulses A, B, C, and D imposed thereon is shown in FIG. 2b. The signals A, B, C, and D represent signals coupled to power line 14", and hence to the rest of the interconnected network including lines 14' and 14, by control transmitter 30 to selectively operate control receivers, such as 18 and 18' in FIG. 1. The heating units are actuated on the occurrence of predetermined conditions at thermostat 34 and at preselected times. An example of such circumstances may be that the heating units are operated when a temperature of less than 40° F. is detected by thermostat 34 between the hours of 7:00 p.m. and 7:00 a.m. when the building is ordinarily not in use.

Figure 3A:
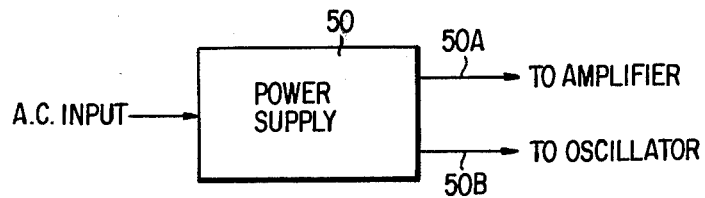
FIG. 3a is a wiring diagram of a power supply circuit for the transmitter of FIG. 3.
Figure 3:
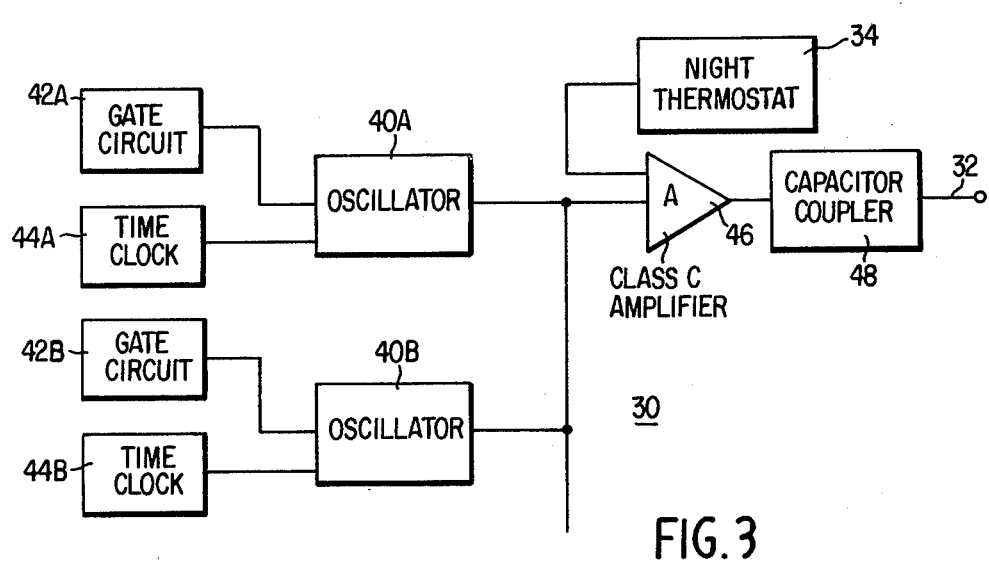
FIG. 3 is a wiring diagram of a control signal master transmitter in accordance with the present invention.

Referring particularly to FIG. 3, the control transmitter 30 as shown includes two crystal controlled oscillators 40A and 40B, operative at a frequency greater than the frequency of the electrical power supply network. The oscillators are controlled by a gating circuits 42A and 42B with a 60Hz repeat rate to correspond to the 60 Hz frequency of the power supply network as indicated by sine wave 36 of FIG. 2a and 2b. Additionally, 7-day electromechanical timers 44A and 44B are connected to oscillators 40A and 40B, respectively, to control the time periods during which the oscillators are on or off. The outputs of the crystal oscillators are connected to a class C amplifier 46. The on-off operation of the class C amplifier 46 is controlled by the night thermostat 34. Advantageously, this thermostat may be a conventional bimetallic thermostat. The thermostat ensures fail-safe operation in the preselected temperature range, as in the 40° F. range where the space heaters 12 are to be cut off as in the example previously mentioned. The output of amplifier 46 is coupled by a capacitative coupling circuit 48 through conductors 32 to the power outlet 26 (FIG. 1).

Considering again the example of employing the invention to bar operation of space heaters 12 when the temperature at the thermostat 34 is above 40° F. between 7:00 p.m. and 7:00 a.m., the oscillator 40A is designed to oscillate at the frequency to which the receivers 18 respond, and the time clock 44A sets the oscillator 40A in the night set mode to permit its operation during the prescribed period. The night thermostat 34 then acts through amplifier 46 to insure fail-safe operation of the night set back at the 40° F. setting. Alternatively the transmitter may be controlled by manual switches at a central location such as a hotel desk in place of the electromechanical time clock. For instance, another example would be a master transmitter with 100 control frequencies located in the front desk of the hotel lobby with each of the 100 rooms having a corresponding receiver which will respond to a clerks command. The receiver in return will energize or de-energize the air conditioning or heating units.

FIG. 3a shows a conventional direct current power supply unit 50 connected for enerization from the power line at 110–117 volts to supply the B+ voltage for the oscillators and amplifier of the transmitter. This direct current output voltage, which is preferably about 165 volts, is supplied through output conductors 50A and 50B.

Figure 4:
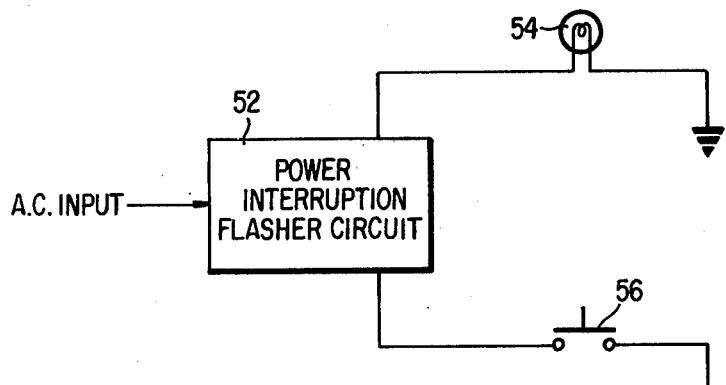
FIG. 4 is a wiring diagram of a current interruption indicator circuit for use in the present invention.

FIG. 4 shows a power outage indicator circuit which, for convenience, is preferably located in the vicinity of the transmitter 30. The outage indicator circuit includes a power interruption flasher circuit 52 connected to the power line or network in the building to cause a lamp 54 to flash to indicate when a power outage has occurred. This signifies that resetting of the 7-day timers 44A and 44B is probably necessary. The outage indicator circuit may be reset by momentary closure of a reset switch 56.

Figure 5:
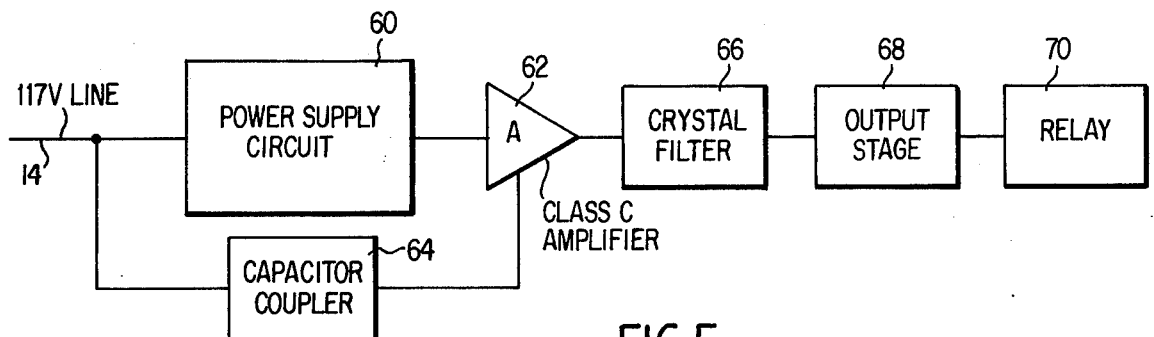
FIG. 5 is a diagram of a control signal receiver in accordance with the present invention.
Figure 6:
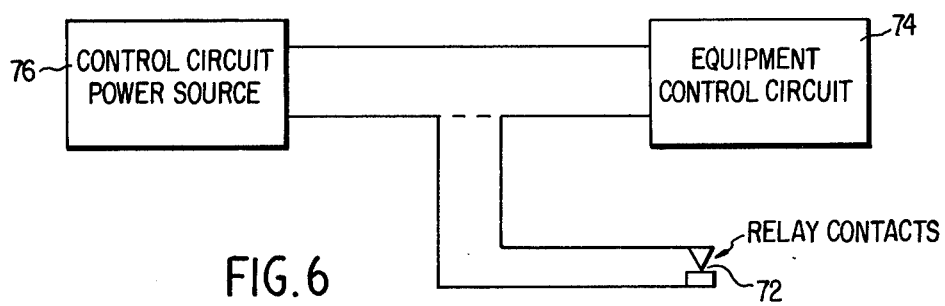
FIG. 6 is a wiring diagram showing the connection of the relay of FIG. 5 to the control circuit, for the temperature regulating apparatus; and, FIG. 7 is a wiring diagram of a circuit for connection to a three phase electric power distribution panel in accordance with the present invention.

A receiver, such as the receiver 18 for controlling a space heater 12 of FIG. 1, is illustrated in detail in FIG. 5. Connected to power supply conductors 14 of the space heater is a power supply circuit 60 supplying direct current B+ voltage to a class C amplifier 62. The power conductor 14 is also connected through capacitative coupling circuit 64 to supply the amplifier 62 with the sine wave line signal 36 (FIG. 2b), including whatever control pulses A, B, C, and D have been imposed thereon by transmitter 30. The output of the amplifier is fed to a crystal filter 66 which passes only pulses derived from that one of the transmitter outputs having the preselected frequency to which the particular receiver is to respond to produce a bias current. Alternatively, the receiver may be responsive to a particular address code composed of two or more tones imposed on the electrical distribution network. The bias current is applied to an output stage 68 which may include a conventional switching transistor which is gated to operate a conventional relay 70. Operation of relay 70 opens contacts 72 shown in FIG. 6 as connected in series with existing equipment control circuit 74 and the control circuit power source 76. Opening of the receiver relay contacts 72 thus renders the equipment control circuit inoperative. In the specific example given, when the control circuit is disabled, the space heater 12 becomes inoperative. Similarly, pulses from an oscillator in the transmitter, producing pulses of the frequency to which the receiver 18' for the air conditioning unit 24 responds, will serve to render the existing control circuit for the air conditioning unit inoperative. When the transmitter discontinues production of corresponding control pulses on the power line or network, the receiver relay 70 is rendered inoperative and the contacts 72 close to place the existing equipment control circuit in command.

Figure 7:
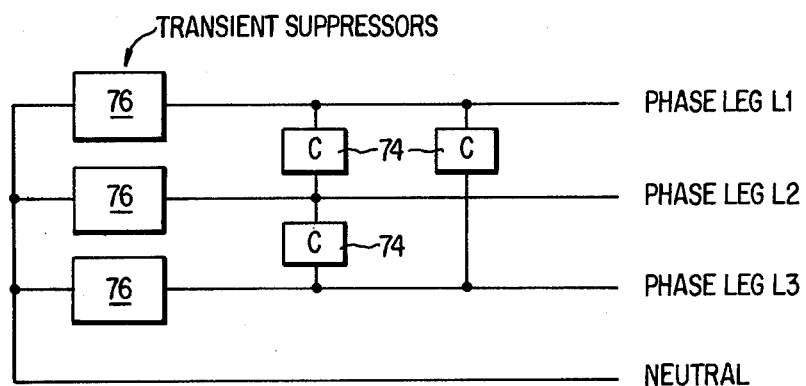

Turning to FIG. 7, conventional capacitors 74 are connected in series across the respective pairs of the three phase legs of the power supply at the power distribution panels. Also a transient suppressor 76, which may be of conventional solid state construction, is provided in series in each phase line L1, L2 and L3 to neutral. In a preferred embodiment the capacitors may be provided to assure circuit continuity for the transmitted control signals throughout the electric power network for those networks with more than one phase leg. The transient suppressors are provided to protect against power spikes and transients falsely triggering the receiver units.

Summarizing the operation of the present system, the pulse gating circuits 42 turn on the oscillators 40A, 40B, etc. of the transmitter 30 at a 60Hz repeat rate only during the period of time selected by the corresponding time clock 44A, 44B, etc. Thus four pulses of four different frequencies, corresponding to A, B, C, and D of FIG. 2b may be transmitted on the power line when four oscillators are employed. The pulses A may control all four space heaters 12 in the work space if desired. However, if different heaters are to be rendered inoperative at one selected thermostat temperature but for different hours of the day, the different time clocks 44A, 44B etc. may act through different frequency oscillators to provide different signals for controlling the different heaters.

Where different temperatures are to be the controlling conditions, as where control of air conditioners is included in the system, switching means may be provided to permit selective substitution of a thermostat having different characteristics for that shown at 34 in FIG. 3. Alternatively, the transmitter 30 may be duplicated with a different thermostat and the outputs of both transmitters simultaneously applied to the wiring network to provide pulses with different frequencies to receivers controlling different devices.

It will appear from the foregoing description, that the system is readily adaptable to control different combinations of heaters, air conditioners, ventilators and other equipment than are described in detail.

The principles, preferred embodiments and modes of operation of the present invention have been described in the foregoing specification. The invention which is intended to be protected is not, however, to be construed as limited to the particular forms disclosed, since these are to be regarded as illustrative rather restrictive. Variations and changes therefore may be made by those skilled in the art without departing from the spirit and scope of the present invention.

What is claimed is:

1. An energy conservation control system for a structure having a plurality of space heating units, each individually controlled by local thermostatic control circuits connected to the existing electrical power distribution network in the structure, each thermostatic control circuit being operative to actuate a respective heating unit at a first selectable ambient temperature within a first range of temperatures so long as the circuit is provided with electric power from the electrical distribution network, said control system comprising:
   a master control thermostat for providing a signal responsive to the occurrence of a second selectable ambient temperature within a second range of temperatures, lower than the first range of temperatures;
   a timer for providing a timing signal at preselected times during at least one twenty-four hour period;
   a transmitter for applying electrical pulses at at least one preselected control frequency to the electrical distribution network; and
   a receiver connected to the electrical distribution network for detecting pulses at a preselected control frequency and for controlling the electric power supplied to a local thermostatic control circuit responsive to the detected pulses so that the local thermostatic control circuit receives no electrical power during a selected portion of the twenty-four hour period so long as the temperature at the master thermostat is above the second selectable temperature and so that the local thermostatic control circuit receives electrical power during the selected portion of the twenty-four hour period when the temperature at the master thermostat is below the second selectable temperature.

2. The apparatus of claim 1 wherein said timer is a seven-day timer.

3. The apparatus of claim 1 wherein an air conditioning unit, controlled by a local thermostatic control circuit, is located within the structure and wherein said apparatus further comprises a receiver connected to the electrical distribution network for detecting pulses at another preselected control frequency for controlling the electric power supplied to the local thermostatic control circuit of the air conditioning unit.

4. The apparatus of claim 1, wherein:
   the electrical distribution network is a three phase distribution network;
   and wherein the apparatus further comprises:
      a capacitor connected across each of said three phases; and
      a transient suppressor connected in series in each of said three phases.

5. In a structure having a temperature regulating system including a plurality of temperature regulating units, each controlled by a local thermostatic control unit powered from an electrical distribution network in the structure, a method of modifying the temperature regulating system to conserve energy consumed by the temperature regulating units by overriding the local thermostatic control units to change the temperature at which the regulating units are operated, comprising the steps of:
   providing a master control timer and thermostat operatively connected to the regulating units via the electrical distribution network without the provision of separate control cables;
   monitoring the temperature within the structure at the master control;
   providing a timing signal at the master control at preselected times during at least one twenty-four hour period;
   applying electrical pulses at at least one preselected control frequency to the electrical distribution network responsive to the monitored temperature and the timing signal;
   providing a receiver coupled to a temperature regulating unit and connected to the electrical distribution network;
   detecting the electrical pulses at the receiver; and
   controlling the temperature regulating unit responsive to the detected electrical pulse thereby selectively overriding the local thermostatic control unit associated with the temperature regulating unit.

\* \* \* \* \*